June 22, 1954     A. C. GALAN ET AL     2,681,570
LIQUID LEVEL GAUGE
Filed March 20, 1953     2 Sheets-Sheet 1
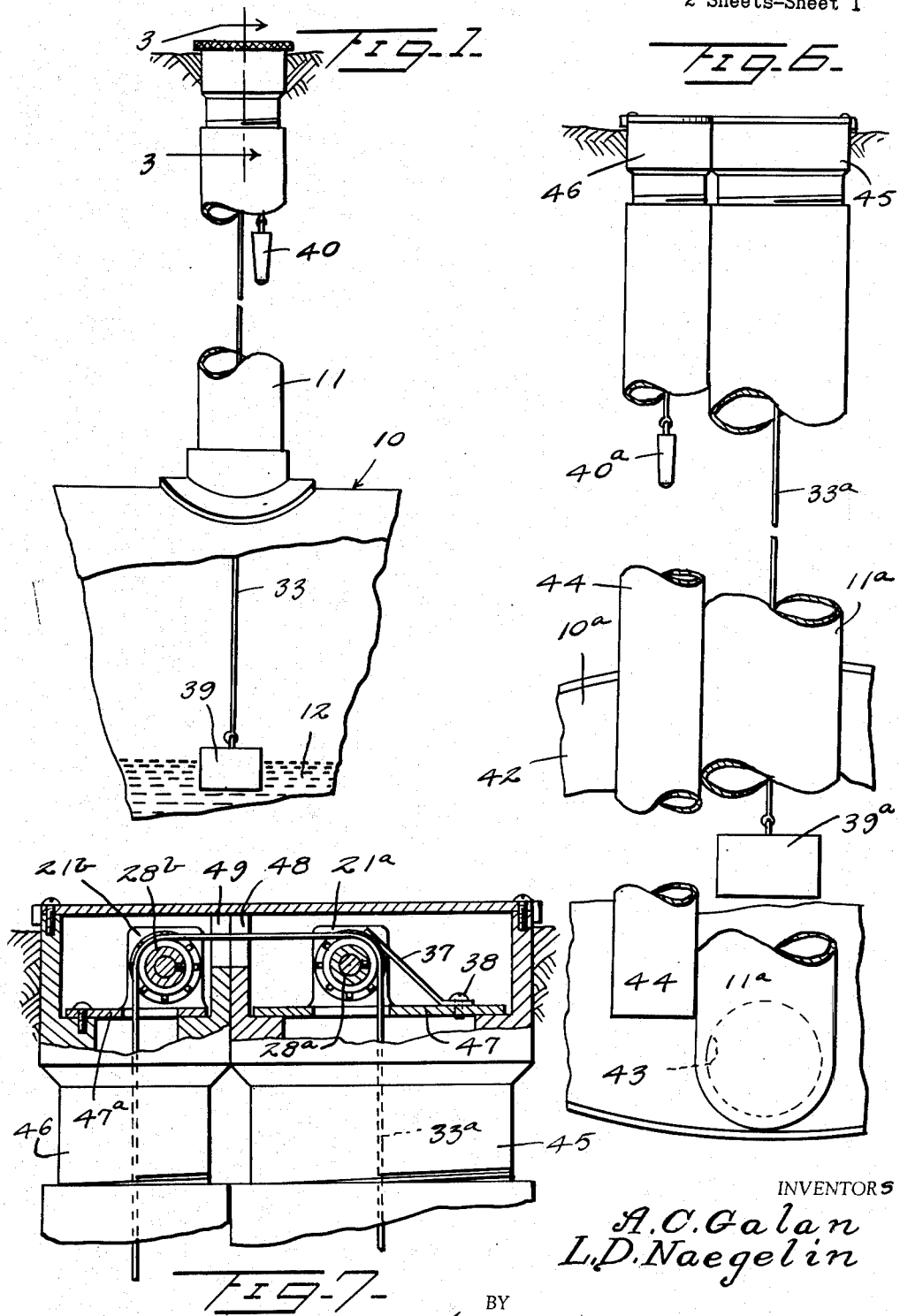
INVENTORS
A.C. Galan
L.D. Naegelin June 22, 1954 — A. C. GALAN ET AL — 2,681,570
LIQUID LEVEL GAUGE
Filed March 20, 1953 — 2 Sheets-Sheet 2
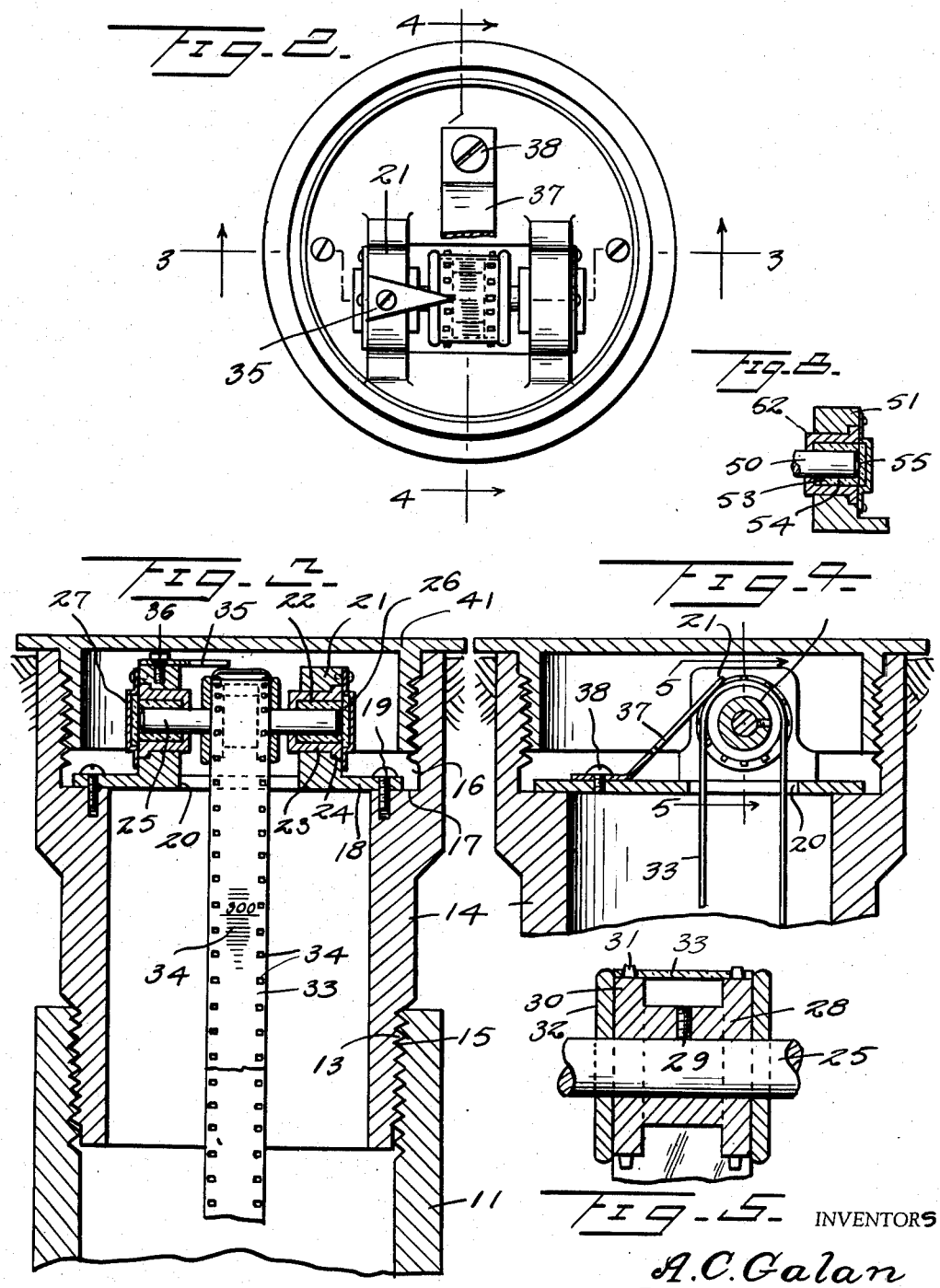
INVENTORS
A.C. Galan
L.D. Naegelin
BY
Kimmel & Crowell ATTORNEYS Patented June 22, 1954

2,681,570

UNITED STATES PATENT OFFICE 2,681,570

LIQUID LEVEL GAUGE

Albert C. Galan and Louis D. Naegelin,
San Antonio, Tex.

Application March 20, 1953, Serial No. 343,608

2 Claims. (Cl. 73—321)

This invention relates to liquid level gauges.

In a tank containing liquid, particularly an underground tank containing volatile fluid, such as gasoline, various devices have been used for determining the amount of fluid in the tank. One of the most commonly used and probably the most inaccurate devices is a long stick with calibrations on the stick. The stick is inserted through the filler pipe and the quantity of fluid in the tank is read from the moisture line on the stick.

It is well known that this procedure is very inaccurate, as the fluid will creep upwardly on the stick, and the stick will not only deteriorate, but the bottom end of the stick soon becomes damaged.

It is, therefore, an object of this invention to provide a liquid level or quantity gauge which is formed of non-corrosive material and will instantly show the quantity of liquid in a tank.

Another object of this invention is to provide a liquid level gauge which is simple in construction and accurate as to operation, and will not require computations in order to determine the quantity of fluid in the tank.

A further object of this invention is to provide a liquid level gauge which will effect greater safety, particularly where highly volatile liquids are in a tank, the gauge being formed of non-ferrous material so that no sparks will be produced.

With the above and other objects in view, our invention consists in the arrangement, combination and details of construction disclosed in the drawings and specification, and then more particularly pointed out in the appended claims.

In the drawings:

Figure 1 is a detailed side elevation, partly broken away, of a tank gauge constructed according to an embodiment of this invention, Figure 2 is a plan view of the device with the cover removed, Figure 3 is a sectional view taken on the line 3—3 of either Figures 1 or 2, Figure 4 is a fragmentary sectional view taken on the line 4—4 of Figure 2, Figure 5 is a fragmentary sectional view taken on the line 5—5 of Figure 4, Figure 6 is a detailed side elevation, partly broken away, of a modified form of this invention, Figure 7 is a fragmentary side elevation, partly broken away, on an enlarged scale showing the upper end of the structure embodied in Figure 6.

Figure 8 is a fragmentary vertical section showing a modified jewel bearing for the tape pulley.

Referring to the drawings and first to Figures 1 to 5 inclusive, the numeral 10 designates generally a tank which is preferably disposed underground, and is provided with an upwardly extending pipe 11. In order to provide a means whereby the level of the liquid 12 disposed in the tank 10 may be accurately gauged at all times, we have provided a gauge structure which includes a cylindrical housing 14 having external threads 13 at its lower end for threaded engagement with internal threads 15 formed in the upper end of the pipe 11.

The housing 14 is provided adjacent the upper end thereof with a counterbore 16 which forms an annular shoulder or ledge 17 at a point spaced downwardly from the upper end thereof. A disc-shaped plate 18 is secured by fastening means 19 on the ledge or shoulder 17 and is formed with a substantially centrally disposed opening 20.

A pair of upwardly projecting ears or lugs 21 are carried by the plate 18 and each lug 21 has disposed therein a jewel bearing sleeve 22 which is carried by a cylindrical sleeve 23 having an annular flange 24 at the outer end thereof. A shaft 25 is journalled in the jewel bearing sleeves 22 and the shaft 25 is held against endwise movement by means of end thrust jewel members 26 which are carried by end caps 27.

A pulley 28 is secured by fastening means 29 to the shaft 25 between the ears 21, and the pulley 28 is provided on each annular flange or rim 30 thereof with a plurailty of peripheral teeth 31. A pair of end plates 32 are fixed on the shaft 25 at the opposite ends of the pulley 28, and project slightly beyond the peripheries of the flanges 30 so as to thereby hold a flexible calibrated tape 33 against sidewise movement on the annular flanges 30.

The tape 33 is provided with openings 34 through which the teeth 31 are adapted to engage, and the exterior or outer side of the tape 33 is provided with calibrations or graduations 34 which are adapted to indicate the amount of liquid 12 remaining in the tank 10.

A pointer or indicator 35 is secured by fastening means 36 to one of the ears 21 and overlies the tape 33, where the latter extends over the pulley 28. An obliquely angled resilient retainer 37 is secured by fastening means 38 to the base plate 18 and extends upwardly and inwardly toward the pulley 28. The retainer 37 preferably is normally disposed out of contact with the tape 33 so that the retainer 37 will not frictionally hold the tape 33 against movement while at the same time the retainer 37 will prevent the tape 33 from riding off of the teeth 31 of the pulley 28.

The lower end of the tape 33 has secured thereto a float 39 which is adapted to engage in the liquid 12 and the opposite end of the tape 33 has secured thereto a counterbalancing weight 40. The weight 40 extends downwardly in the pipe 11 and weight 40 is adapted to move up or down in accordance with the variations in the level of the liquid 12 in the tank 10. A cap 41 is threaded into the upper end of the housing 14 and normally closes the upper end of the housing.

Referring now to Figures 6 and 7, there is disclosed a modified form of this invention wherein the tank 10a is a relatively large tank and a vertically disposed gauge tube 11a is disposed along the end wall or head 42 of the tank 10a. The lower end of the tube or pipe 11a is in communication with the interior of the tank 10a through the head 42 and an opening 43 which is formed in the head 42. A second vertically disposed tube or pipe 44 is fixed to the outer side of the pipe or tube 11a, and a pair of housings 45 and 46 are secured in the upper ends of the tubes 11a and 44. The housing 45 is substantially identical with the housing 14, and has mounted in the upper end thereof a plate or base 47 having a pulley 28a journalled between upstanding ears 21a which are carried by the plate 47.

A flexible calibrated tape 33a is trained over the toothed pulley 28a and extends upwardly and horizontally from pulley 28a through slots 48 and 49 which are formed in the housings 45 and 46. A second toothed pulley 28b is journalled between ears 21b carried by a plate 47a which is fixed in the upper portion of the housing 46. The lower end of the tape 33a which is disposed in the tube 11a has secured thereto a float 39a and the end of the tape 33a which is positioned in the tube or pipe 44 has secured thereto a counterbalancing weight 40a.

In the use and operation of this gauge, the tank 10 is adapted to have the liquid 12 disposed therein, and preferably this liquid is of a volatile characteristic, such as gasoline or the like. The gauge structure is mounted in the vertical pipe 11, with float 39 engaging in the liquid 12. The quantity of liquid in tank 10 is read at the end of the pointer or indicator 35.

Where the tank is of a relatively large size, the gauge structure shown in Figures 6 and 7 is connected with the tank 10a. The gauge structure embodying the flexible tape 33a operates in the same manner as the gauge structure shown in Figures 1 to 5 inclusive.

By having a tape which is non-corrosive and non-ferrous with the other elements of the gauge structure non-ferrous or non-corrosive, the gauge structure will operate correctly at all times.

Referring to Figure 8, there is disclosed a modified form of jewel bearing for the pulley shaft 50. Each ear 51 has disposed therein a flanged cylindrical sleeve 52 within which a cup shaped bearing member 53 is mounted. Bearing member 53 is formed of a cylindrical bearing sleeve 54 and an integral end cap 55. Bearing member 53 is formed of non-ferrous material, such as glass or a jewel.

We do not mean to confine ourselves to the exact details of construction herein disclosed, but claim all variations falling within the purview of the appended claims.

What is claimed is:

1. A tank gauge for mounting in a vertical tube communicating with the tank, said gauge comprising a tubular housing having means for connection with said tube, a ledge formed in the upper portion of said housing, a plate seating on said ledge and having an opening, a pair of upstanding bearing ears carried by said plate, a toothed pulley rotatably disposed between said ears, a flexible calibrated tape engaging over said pulley and extending downwardly through said opening and housing into said tank, a float secured to one end of said tape, a counterbalancing weight secured to the other end of said tape, and a pointer secured to one of said ears and overlying said tape.

2. A tank gauge for mounting in a vertical tube communicating with the tank, said gauge comprising a tubular housing having means for connection with said tube, a ledge formed in the upper portion of said housing, a plate seating on said ledge and having an opening, a pair of upstanding bearing ears carried by said plate, a toothed pulley rotatably disposed between said ears, a flexible calibrated tape engaging over said pulley and extending downwardly through said opening and housing into said tank, a float secured to one end of said tape, a counterbalancing weight secured to the other end of said tape, a pointer secured to one of said ears and overlying said tape, and a resilient retainer fixed to said plate and projecting obliquely upwardly over a portion of the tape engaging about said pulley for retaining said tape on said pulley.

References Cited in the file of this patent

UNITED STATES PATENTS

| Number | Name | Date |
| --- | --- | --- |
| 2,206,329 | Olsen | July 2, 1940 |
| 2,568,348 | McCauley | Sept. 18, 1951 |

FOREIGN PATENTS

| Number | Country | Date |
| --- | --- | --- |
| 18,529 | Great Britain | Nov. 1, 1895 |